(12) United States Patent
Gao

(10) Patent No.: US 6,983,238 B2
(45) Date of Patent: Jan. 3, 2006

(54) METHODS AND APPARATUS FOR GLOBALIZING SOFTWARE

(75) Inventor: Kejia Gao, Beijing (CN)

(73) Assignee: American International Group, Inc., New York, NY (US)

( * ) Notice: Subject to any disclaimer, the term of this patent is extended or adjusted under 35 U.S.C. 154(b) by 295 days.

(21) Appl. No.: 09/778,987

(22) Filed: Feb. 7, 2001

(65) Prior Publication Data

US 2002/0107684 A1 Aug. 8, 2002

(51) Int. Cl.
*G06F 9/45* (2006.01)
*G06F 17/20* (2006.01)

(52) U.S. Cl. ......................................... 704/8; 717/136
(58) Field of Classification Search ................ 717/136, 717/137; 704/2, 8
See application file for complete search history.

(56) References Cited

U.S. PATENT DOCUMENTS

| | | | | |
|---|---|---|---|---|
| 5,434,776 A | * | 7/1995 | Jain | 704/8 |
| 5,900,871 A | * | 5/1999 | Atkin et al. | 345/866 |
| 6,035,121 A | * | 3/2000 | Chiu et al. | 717/141 |
| 6,092,036 A | * | 7/2000 | Hamann | 704/8 |
| 6,119,079 A | * | 9/2000 | Wang et al. | 704/8 |
| 6,185,729 B1 | * | 2/2001 | Watanabe et al. | 717/100 |
| 6,278,967 B1 | * | 8/2001 | Akers et al. | 704/2 |
| 6,496,793 B1 | * | 12/2002 | Veditz et al. | 704/8 |

OTHER PUBLICATIONS

Kuhn, R., Learning speech semantic with keyword classification trees, 1993, IEEE Internaltion Conference, vol. 2, 27–30 and pp. 55–58, vol. 2.*

* cited by examiner

*Primary Examiner*—Tālivaldis Ivars Šmits
*Assistant Examiner*—Myriam Pierre
(74) *Attorney, Agent, or Firm*—Parsons Hsue & de Runtz LLP

(57) ABSTRACT

A method is proposed for processing software or Website code associated with a primary locale by an automatic, or semi-automatic, parsing process. The method separates the code into a file of international code which is not locale dependent, and a resource pack of items specific to the primary locale. The international code and the resource pack co-operate to perform the function of the original code. The resource pack can be converted for any number of other locales. Each converted resource pack together with the international code has the effect of the original code adapted for another locale.

21 Claims, 6 Drawing Sheets

METHODS AND APPARATUS FOR GLOBALIZING SOFTWARE

FIELD OF THE INVENTION

The present invention relates to methods and apparatus for automatically, or semi-automatically, processing software or Website code containing information specific to a locale, to generate globalised software.

BACKGROUND OF THE INVENTION

In this document, we use the terms "Website code" to refer to mark-up languages, script languages and programming languages (present languages of their successors) defining a Website, and "Software" to refer to programs written in any programming language, such as Java, C, C++, VisualBasic, Perl, COBOL, SQL, C#, etc. Software and Website code frequently include information in a format which is appropriate to a particular locale. For example, the display and user interfaces presented to clients are usually in a language which in common use in that locale. In the case of Website code which defines a retail Website for clients in a particular locale, prices are frequently quoted in the currency of the locale. Times are given according to the time zone of that locale. All such information (language and culture dependent information) is here referred to as "locale dependent" information.

In general, software written for users in a particular locale must be adapted for other users' locales. For example, a user interface defined by the software to permit a user to control the software, may need to be translated from one language to another. As for Website code, it is estimated, that there are presently about 200 million non-English speaking Internet users, and it is furthermore known that, in the case of a Website which advertises products, people are three times more likely to buy products presented in their native language than if the products are presented to them in a language which, though they understand it, is not their native language. This fact makes it highly desirable to be able to ensure that a Website which is accessed by clients in a certain locale contains locale dependent information appropriate to that locale.

Traditionally, to solve the problem of providing multilingual support, companies utilise a two-tier process, in which the software or Website code is first developed for a certain locale, and then, when required, the format is converted for each other locale (e.g. manually), with a conversion process per locale. This process is cumbersome, time-consuming, costly and inefficient to manage, maintain and support. It must be repeated whenever it is intended to provide code appropriate for a new locale. The conversion process may be carried out using manually by string replacements using an Editor or using a table of replacements.

SUMMARY OF THE INVENTION

The present invention aims to provide new and useful methods and apparatus for automatically, or semi-automatically, processing software or Web code containing information specific to a first locale.

In general terms, the present invention proposes that software or Website code including information which is associated with a first locale (or "primary locale"), is transformed by an automatic, or semi-automatic, parsing process of "Internationalisation" to separate it into a file of international code (which is not locale dependent), and a resource pack of items specific to the first locale. The internationalisation process includes an analysis of the original code to identify its structure, and based on that analysis an identification of potential items which contain information for insertion into the resource pack.

The resource pack thus generated may then be subject to "localisation", that is conversion into a second resource pack specific to a second locale.

The new process is automated (or semi-automated) and more accurate. Thus, the present invention makes it possible to adapt software or Website code (i) in a shorter time than with the known techniques, (ii) in a cost effective manner, (iii) optionally with multiple localisation simultaneously (iv) with improved quality control, and (v) with increased consistency for easier management, maintenance, upgrade and support.

The identification of potential items which contain information for insertion into the resource pack uses "internationalisation rules". Preferably, these rules can be supplemented by a user to refine the internationalisation (e.g. according to knowledge of the primary locale, the programming language or the type of code), and the method employs a rule engine which applies the internationalisation rules.

Note that when it is needed to generate the software for a third locale, this can be done by converting the resource pack for the third locale. The step of internationalisation does not need to be repeated.

The invention may be expressed equivalently as a method, an apparatus arranged to carry out the method, or a computer program product carrying computer-readable program instructions for causing a computer to carry out the method.

BRIEF DESCRIPTION OF THE FIGURES

Embodiments of the invention will now be described, for the sake of example only, with reference to the following figures in which.

DETAILED DESCRIPTION OF THE EMBODIMENTS

We now describe two embodiments of the invention. The first embodiment is for internationalizing Software. The second is for internationalizing Website code.

1. A First Embodiment of the Invention

Overview of the First Embodiment

Embodiments of the invention may be referred to as performing SGIL (Software Globalisation via Internationalisation and Localisation). "Internationalisation" is sometimes abbreviated here, especially in the figures, as "I18N", while "Localisation" is abbreviated "L10N".

Figure 1:
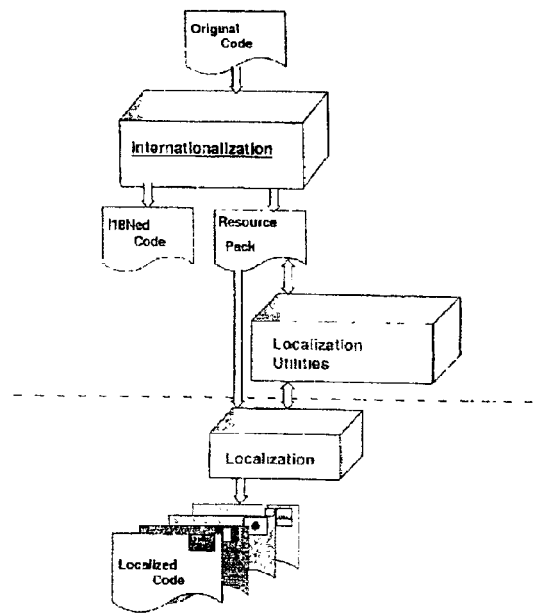
FIG. 1 is a schematic diagram of the operation of a first embodiment of the invention.

FIG. 1 shows (above the dashed line) a first embodiment of the invention which is a package of computer software. The embodiment consists of a software globalisation framework with a set of components, Application Program Interfaces (API), and utilities to enable and enhance software globalisation via internationalisation and localisation.

As shown in FIG. 1, the embodiment takes as an input "original code" which contains a certain amount of language and culture dependent information which is associated with a first locale (the "default locale"). In principle, the default locale may be any locale, though in practice it is frequently the US. In an internationalisation phase, the "original code" is divided by into internationalized source code ("I18Ned" source code) which is locale independent, and a locale dependent resource pack, which is a set of one of more "resource files".

The embodiment further includes a set of "localisation utilities". These are not used in the process of internationalisation. However, they are used to improve and enhance the localisation process. Specifically, a user of the embodiment (who performs the processes shown below the dashed line) has access to the resource pack prepared by the internationalisation process. He performs a localisation process, e.g. using the localisation utilities provided in the embodiment, to convert the resource pack for the default language into other resource packs, each corresponding to a different locale. The combination of the Internationalized code and the converted resource packs is this localised code appropriate for the new locales.

Figure 2:
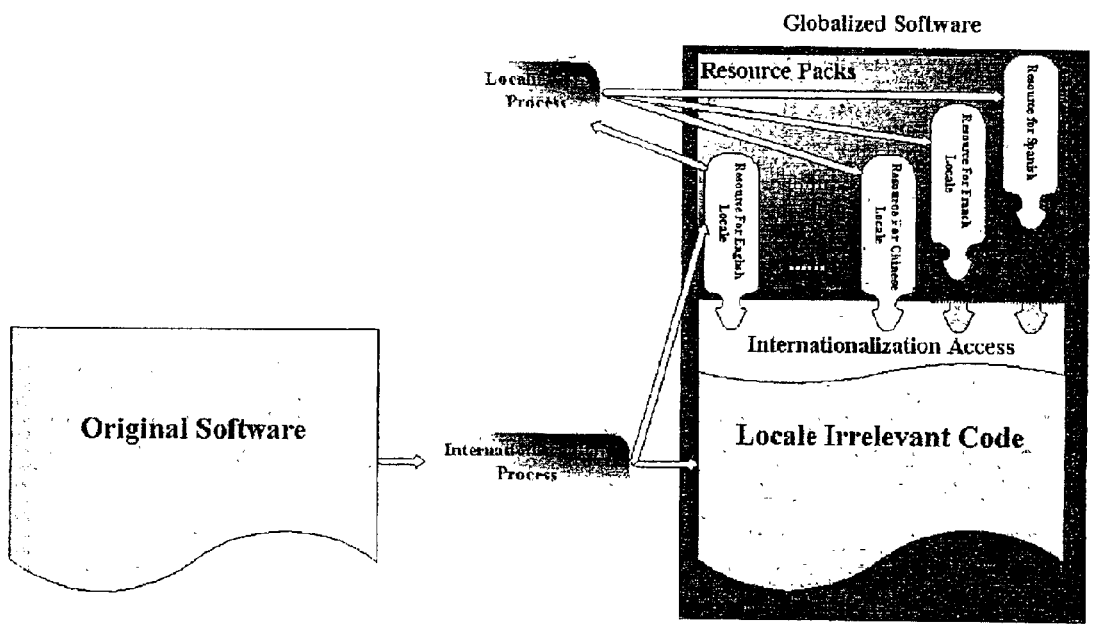
FIG. 2 is another schematic diagram of the operation of the first embodiment of the invention.

The result is software in a format shown schematically in FIG. 2. FIG. 2 indicates, in addition to the resource pack for the default locale ("English") created during the internationalisation process, resource packs created during the localisation process for China, France and Spain, each of which is combinable with the international, locale irrelevant code (that is the internationalized code) to form software for that locale.

Architecture

Figure 3:
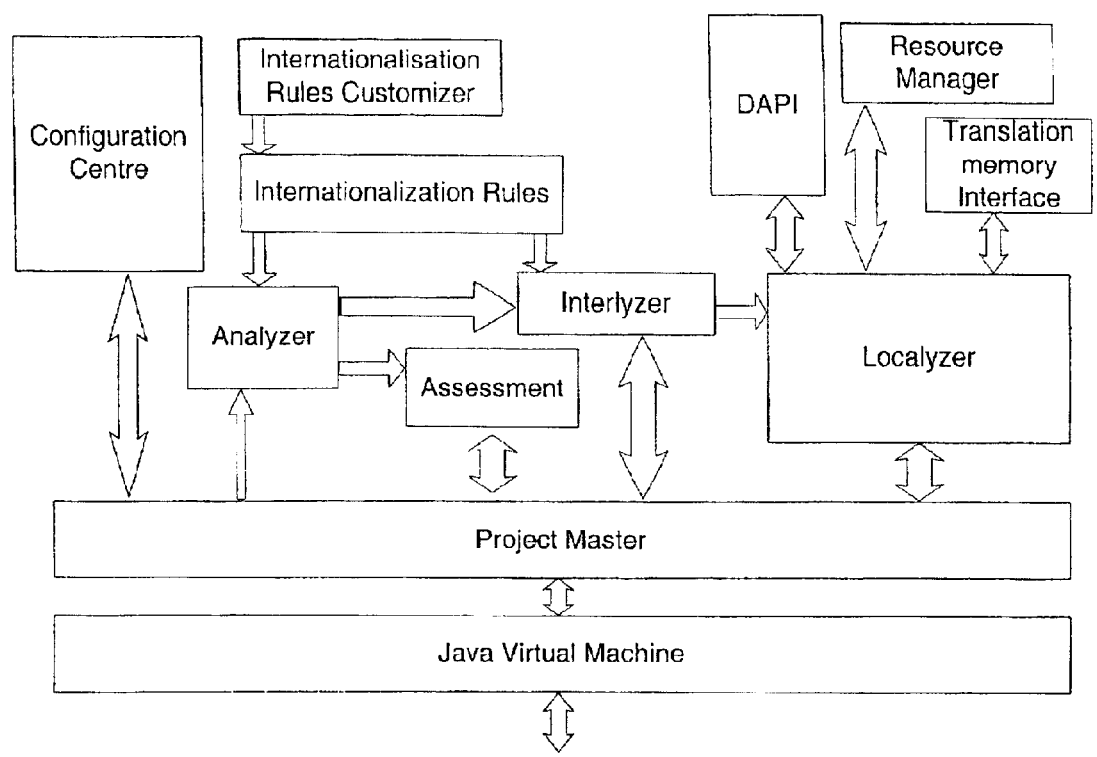
FIG. 3 shows the architecture of the first embodiment of the invention.

The architecture of the embodiment is as shown in FIG. 3. Specifically, the components of the first embodiment are:

1) A Java virtual machine (JVM). This is component operates in a known manner the interface between the embodiment and the operating system on which the embodiment runs, such as Windows 9X/NT/2000, Sun OS Solaris 2.X, Linux, or any operating system which supports JVM.

2) The Project Master acts as a management tool to organise projects. It controls all the globalisation dependent files, such as the source files and resource files, and the other components of the system described below.

3) The Configuration Centre is an interface for communication with the user which allows the user to set and configure the operation of the embodiment.

4) The Analyzer is a source-code analysis component designed to understand the source code syntax structure and to detect potential Internationalisation errors such as hard-coded text and locale dependent functions based on the a set of Internationalisation Rules described below. The analyzer generates recommendations on how to solve potential Internationalization errors. The Analyzer operates in the following four phases: lexical, syntax, semantic and internationalisation analysis each of which transforms the source program from one representation to another. Analyzer constitutes a language I18N/L10N engine embedded as a kernel component of the architecture of the embodiment.

5) The Internationalisation Rules component is a set of rules by which potential Internationalisation errors in source code are determined. By "potential Internationalisation error" is meant a locale dependent item in the source code. Potential Internationalisation errors are the items we need to correct according to the Internationalisation rules.

6) The assessor offers statistics, assessing international or locale readiness.

7) The Interlyzer provides recommendations on how to solve the potential internationalisation errors based on the details of the Internationalisation analysis (Analyzer). It offers suggestions to internationalise locale dependent items such as those relating to literal strings, date, time, currency, weights, and measures, etc. via:

extracting messages based on the I18N rules.

adapting methods based on the I18N rules.

creating resource files and removing hard-coded locale (dependencies of the language and conventions/biases) into the external resource files 8) The Localyzer works on the resource files generated from the Interlyzer. It provides modules (DAPI, Resource Manager, and Translation-Memory Interface) to increase and improve localisation productivity. The Localyzer organises, manipulates, and manages resources to speed up localisation and translation process by providing tools and the environment to integrate other company's localisation products.

9) The DAPI (Dictionary Application Programming Interface) provides an interface for integrating any given language dictionary into the Localyzer for effective message translation.

10) The Resource Manager is a utility to consolidate resource files generated during the internationalisation process. This resource reorganisation includes merging duplicate strings, and generating vocabulary dictionaries. Well-organised resource files can be translated much more quickly and efficiently.

11) The Translation-Memory Interface makes the translating process easier by comparing messages to a database containing the previous work. Fully translated messages are filtered out, leaving only the new messages for translation.

Operation of the First Embodiment

The first embodiment carries out the two processes of Internationalisation (performed mainly by the analyzer and Interlyzer) and Localisation (performed by the Localyzer). The Internationalization process can be carried out:

a) Automatically using a default configuration.

b) Automatically using an Internationalisation-script.

c) Interactively item by item through on-screen choices.

Figure 4:
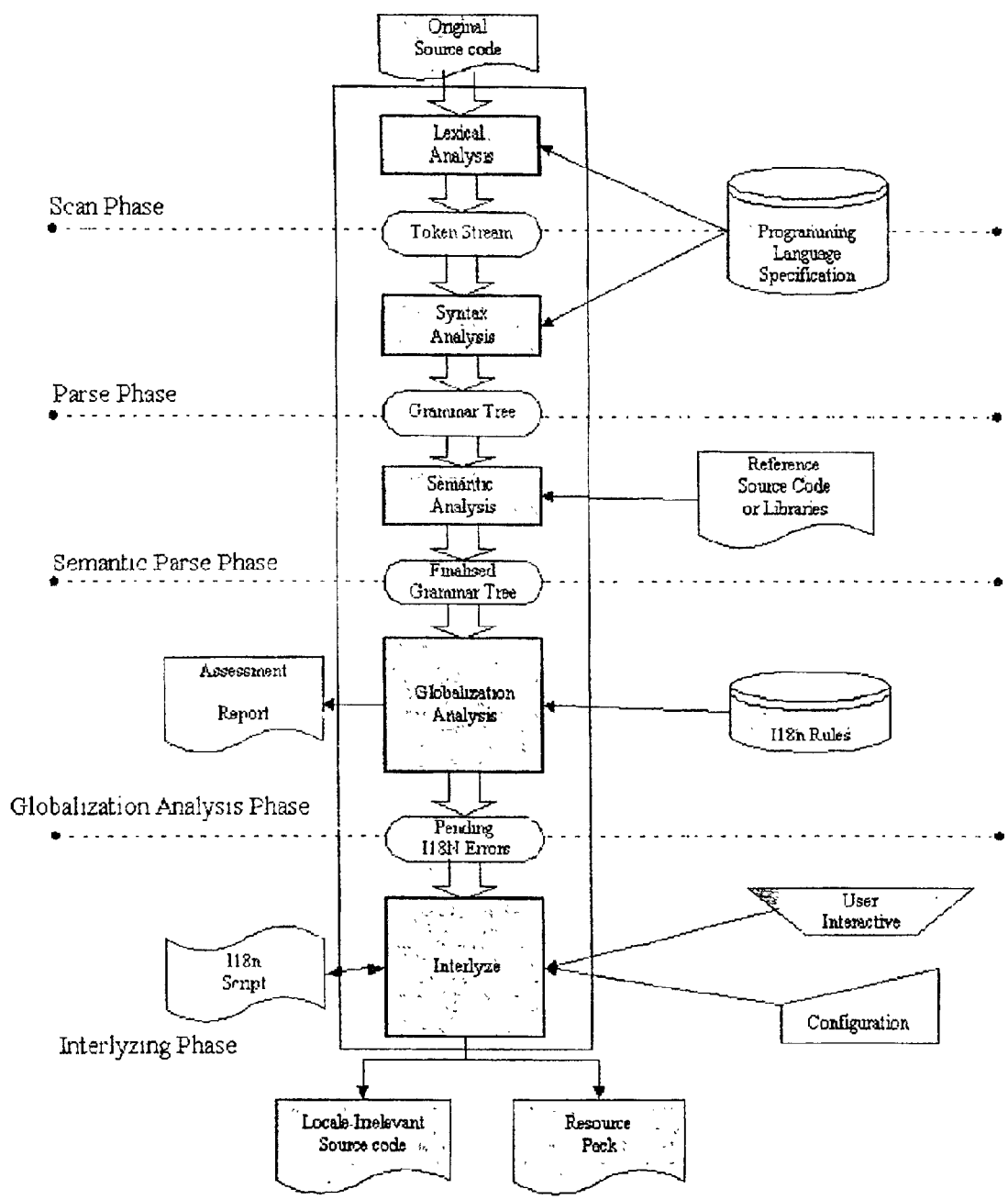
FIG. 4 shows the phases in the internationalisation process of the first embodiment of the invention.

The internationalisation process is divided into (a) a scan phase, (b) a parse phase, (c) semantic analysis phase, (d) a globalisation analysis phase, and (e) interlyzing phase. Phases (a) to (d) are performed by the analyzer and phase (e) by the Interlyzer. FIG. 4 illustrates these phases in detail.

a) The Scan phase can be considered as lexical analysis. In it the stream of characters making up the source code is read from top to bottom and grouped into items that are sequences of characters having a collective meaning. These items are called tokens. In this phase, the constant strings have been detected.

b) The Parse Phase can be considered as syntax analysis. It obtains a stream of tokens generated in the Scan phase and tries to group them hierarchically into grammatical phrases according to the grammar for the programming language. These phrases are represented as a grammar tree. Meanwhile, the program's structure is clear and different expressions are recognised.

c) The Semantic analysis phase goes through the grammar tree, and completes the details for each piece of code, especially determining their type. An important task in this phase is to refer to other source files or libraries related to the current target file. Then the expression type and the actual routine (the function binding) can be determined. In this phase the grammar tree is finalised.

d) The Globalisation analysis phase dissects the grammar tree using the Internationalisation rules. It detects potential internationalisation problems such as hardcoded text, locale specific functions, and locale related data formatting. All of the items are recorded as Potential Internationalisation Errors ("PIE"s).

e) The Interlyzing Phase generates locale independent source code and the resource pack of PIEs. The resource pack also contains for each of the PIEs detailed information such as suggestions for converting the PIE into a globalized statement or form.

During the phases (a) to (e), assessment data on the globalisation readiness of the software is accumulated in the Assessment component of the embodiment.

We now consider in detail the globalisation analysis phase (d). This includes the following steps:

1. Literal String-Analysis

Strings are always primary Internationalisation targets because normally all of the user interface information is generated from String. However, to do this accurately, the embodiment checks the context of all the strings from globalisation analysis of the grammar tree to find out their usage so as to decide whether to internationalise them. The rest of the work is to filter out the exceptions. For example, in Java programming language, the following strings do not need to be internationalized, and so need to be filtered out of the set of PIEs:

♦Fonts: "DialogInput", "Dialog", "Monospaced", "Serif", "SansSerif", and "Symbol".

These strings do not need to be internationalized while they are used for specifying the virtual font name in the Java virtual machine (JVM). The JVM will map (localise) the font to the correct local font during runtime.

♦Layout Strings: "North", "South", "Center", "West", and "East".

In the layout manager components, these strings act as the layout instruction used internally in the JVM.

♦Class names: com.Sybase jdbc2.jdbc.SybDriver . . .

In Java language, class-loader can access a class by its name. This is known as "loaded by name" function and is very useful especially for JDBC (Java Database Connectivity) drivers initialisation. These strings must not be internationalized. The same applies for most of the strings used in java.long.reflect package.

♦URL and Email: http://www.everlastingsystems.com . . .

The URLs and Emails do not need to be internationalized. The same is true for a user name or password.

♦File names: "log.txt". . .

The string used in file open methods stands for the file name and does not need to be internationalized.

♦Control stream: "n"

Sometimes the meaningless strings, which probably are the control stream or internal use only string, do not need to be internationalized.

Besides the filtering, the embodiment systematises the rest strings according to their own characters defined in I18N rules, where the colors or images can be put into separate category so as to deal with them uniformly.

2. Formatting

A compound message may contain several kinds of variable data: dates, times, strings, numbers, currencies, and percentages. Because end users can see these data elements, their format must conform to various cultural conventions.

For example, if the program wants to present the following message:

"At <time> on <date > we are going to meet our <num > customers in the city of <place >"

Where the items quoted with angle brackets are the variables compounded in this message. The result after the replacement of these variables looks like:

"At 9:00 am on Jan. 15, 2000, we are going to meet our 1,600 customers in the city of San Jose"

But it is totally different for another locale in the following respects:

♦Word order

For some languages, the verb appears at the end of the sentence. The Internationalisation Rule for messages solves this problem by using a subroutine known as MessageFormat.

♦Plural

The words in a message may vary if both plural and singular word forms are possible. An Internationalisation rule for plurals detects the message compound with numerical variable and use a subroutine known as ChoiceFormat to map a number to a word or a phrase, allowing the construction of grammatically correct messages.

♦Date, Time, Number, Currencies, Percentage

The present of these information is very different for different language, there are a set of Internationalisation Rules to detect the variables and recommend to use subroutines known as DateFormat, TimeFormat, NumberFormat, CurrencyFormat, and PercentageFormat.

•Collations

Applications that sort through text perform frequent string comparisons. But a binary comparison of the characters within two strings does not correspond to the relative order for most non-Latin locales. The rule for this is to suggest that a Collation Library is used instead.

•Checking Character Properties

Checking character properties is a common way to verify the data entered by end users, but comparing it with character constants is wrong because it works only with English and a few other languages. The embodiment points them out and suggests using a method provided by the internationalisation rules.

•Other locale dependent method invocation

Some other method invocations in the source code may be deprecated by the new internationalisation support, such as getting system time without time zone information, and converting bytes to strings without encoding information. There are lots of Internationalisation Rules for the embodiment to find out these method invocations and recommend using the corresponding new ones.

Figure 5:
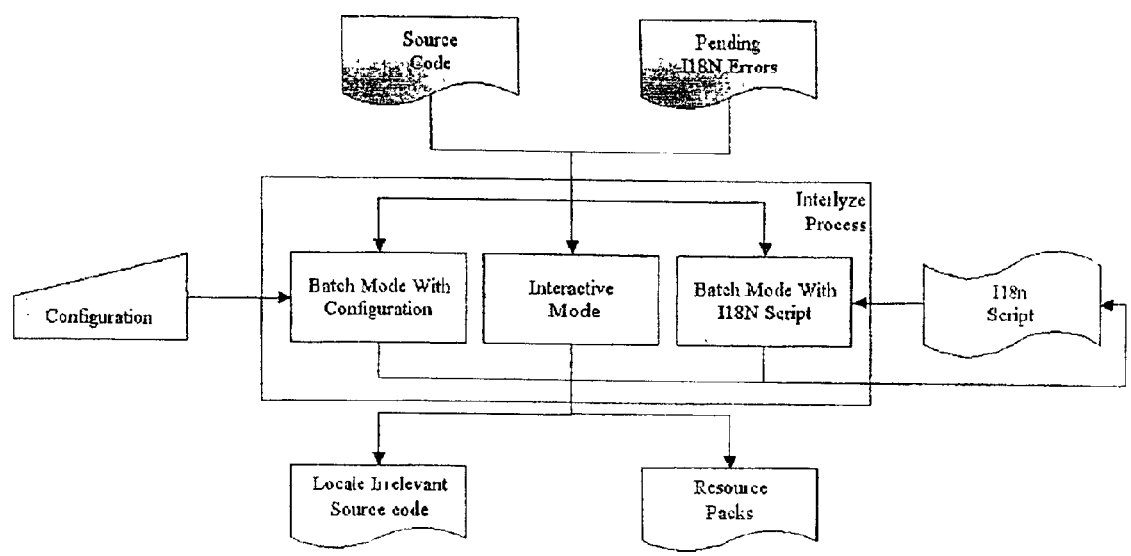
FIG. 5 shows the phases in the interlyze process of the first embodiment of the invention.

We now consider in detail the Interlyze Phase (e). This deals with the PIEs, internationalises the source code either automatically with an Internationalisation script, the configuration as default strategy, or through showing these messages to the users and guiding them to internationalise the source code. The process is shown in detail in FIG. 5.

The configuration is provided within the embodiment and can be tuned by the user according to their special requirements. It covers the strategy for categorising the PIEs and the default action for a certain type of PIE, etc.

The Internationalization Script is a text script which guides the Interlyzer in batch mode to internationalise the software. Normally, the script is generated by the Interlyzer first, modified by the user according to their real requirement, and then takes effect on the other process of internationalisation work. A common scenario is the Internationalisation engineer internationalises the software and generates the script. A tester finds some problem during testing and feeding this information back to the Internationalisation engineer. The Internationalisation engineer modifies the script to fix the problem and then internationalises the software in batch mode again.

Within the Interlyzer, we can configure the following:
a) Where to save Resource Pack and what their formats are.
b) How to organise the Resource Packs.
c) What kind of message should be saved in which Resource File.
d) Whether to deal with choice format or message format.
e) Whether to deal with other formats such as date, time, currency, number.
f) Whether to deal with the collation problem.
g) What is the internationalisation solution for a special locale related function invocation
h) What is the current exception list In the interactive mode all the above settings can be changed by the user.

Figure 6:
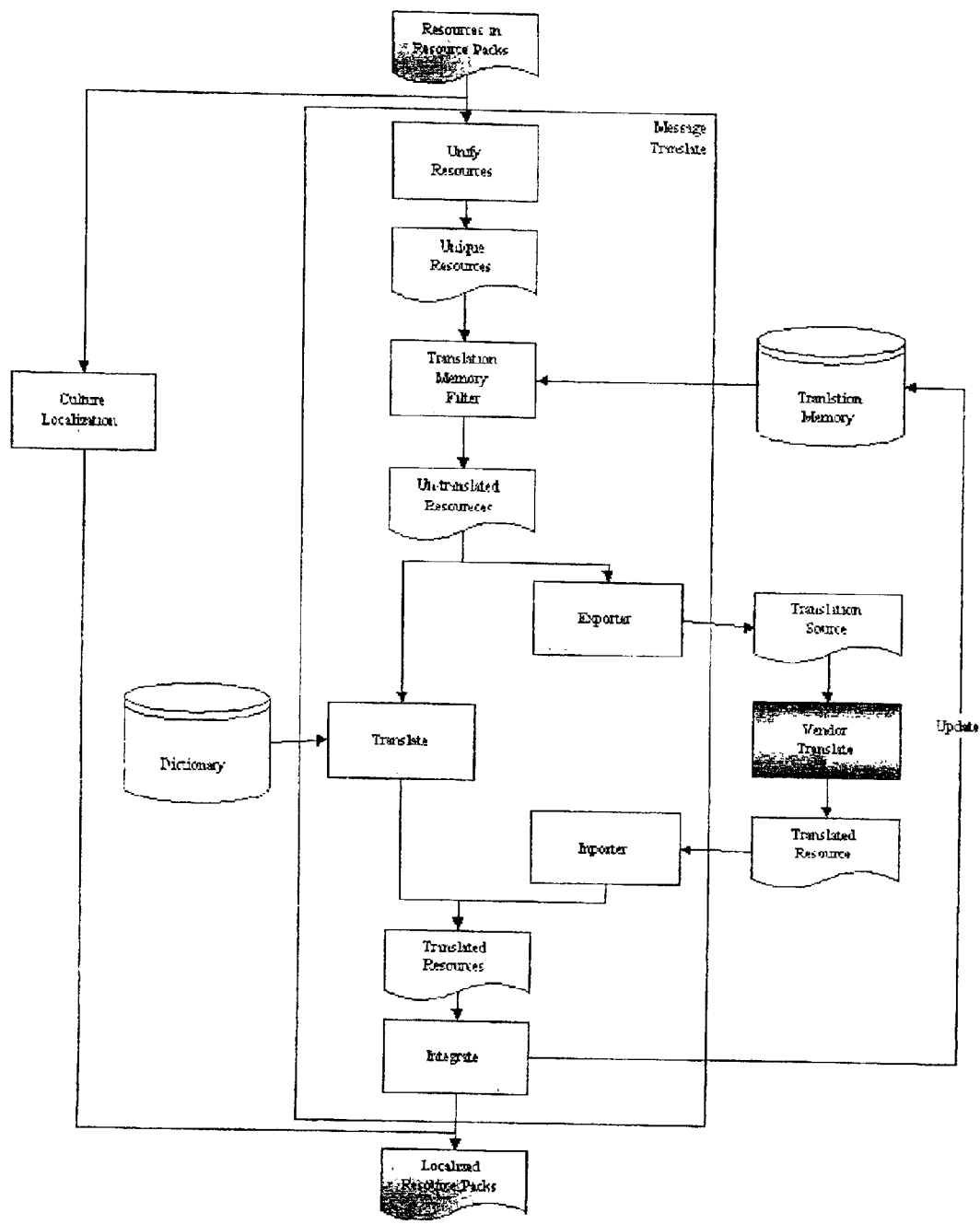
FIG. 6 shows the working flow in the localisation process of the first embodiment of the invention.

We now describe the function performed by the Localyzer. The workflow is shown in detail in FIG. 6. As FIG. 6 illustrates, localisation work can be separated into message translation, and culture localisation.

Culture localisation refers to the translation of the culture related sections to suit a certain locale. These include the format of the date and time, currency translation, the decimal separators, and thousand separators.

For message translation, Localyzer first makes the message unique by eliminating duplicate messages, which we refer to as "unifying resources". Usually there are lots of duplicates of the same message and eliminating the duplicate messages greatly decreases the translation workload and make the consistency.

Then the Translation Memory Filter picks up these unique resources and processes them with a Translation Memory. The translation Memory makes the translating process easier by comparing the messages to a database containing previously translated messages. In addition, it helps to ensure greater consistency. The messages which have been translated before are filtered out, and the messages which have not been translated before are left for the coming translation task.

Translation can be executed in two ways. The first way is to export these messages to translation vendors (marked in FIG. 6 as "vendor translate") which are external to the embodiment. The other is to translate the messages directly word by word by user interaction with the Localyzer.

If a Dictionary is plugged in, it can help the user with this translation. Usually a dictionary, unlike the Translation Memory, provides more than one translation result for a certain item, so user interaction is necessary. Although the embodiment may optionally contain a dictionary itself, the first embodiment includes a component DAPI which enables the user to integrate other dictionaries.

The Integration step in FIG. 6 integrates the messages that were found in the translation memory and the messages that just have been translated, then merges them back into the Resource Packs and updates the Translation Memory for further use.

Second Embodiment of the Invention

Figure 7:
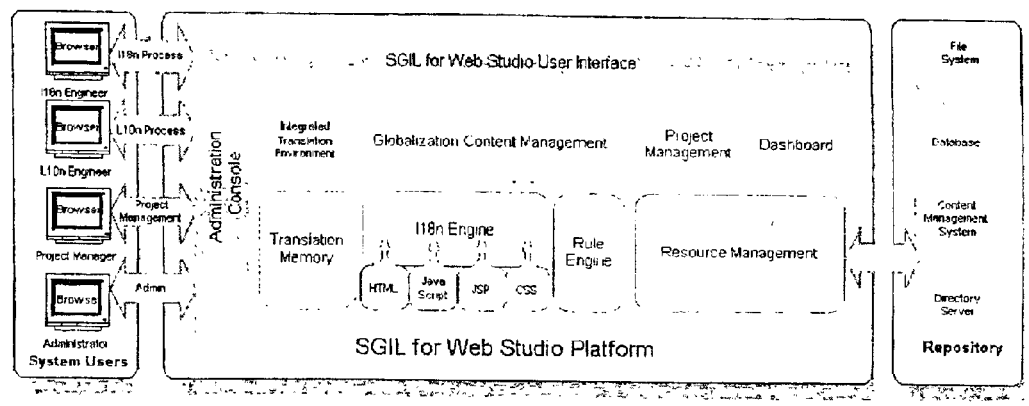
FIG. 7 shows the architecture of a second embodiment of the invention.

FIG. 7 shows the second embodiment, "SGIL for Web Studio". This embodiment, unlike the first embodiment, functions on Website code rather than software. The second embodiment is labelled in FIG. 7 as "SGIL for Web Studio Platform", and is operated by a server, which interacts with users (to the left of the figure) over an internet connection. The platform further interacts with a repository of information.

The overall philosophy of the second embodiment resembles that of the first embodiment. Original Website code is divided into a locale independent template and a resource bundle ("internationalisation"), and the resource bundle is converted from a first locale to one or more other locales.

For the internationalisation process, the second embodiment receives as input Website code which may include any of three kinds of web resource:
1. Client side web pages—that is web pages sent in their entirety to a client's browser. Such web pages include static HTML pages, cascading style sheets, and pages embedded with client side script languages.
2. Java ServerPages—These pages are executed at the server side, only the results are sent to client browsers.
3. CGI service programs written in languages such as Perl, C, C++, VB, etc.—Like server side script pages, they run on the server side and send the result to the client browser.

To internationalise client side scripts, the second embodiment first separates script sections (starting with <script > and ending with </script >) from static HTML section, then invokes a Script Engine to generate a grammar tree for each scriptlet section. The Engine deals with Markup Language Pages. The content will be marked with different tags for build a template. The Internationalisation process will extract format information into cascading style sheets.

For server side script pages, the scriplets are written in Java (JSP), VB Script ASP, PHP, etc. The second embodiment separates static HTML sections from those scripts, then invokes corresponding language engines to internationalise the scriptlets and generate resource bundles.

The globalisation workflow of CGI programs is similar to the process of handling server side script pages. The second embodiment processes the CGI programs by replacing locale sensitive statements with neutral ones. The message information separated from the programs is stored in the resource bundles. The resource format could be several types depending on the specific script language.

The second embodiment comprises an Internationalisation Engine (which performs the internationalisation process), a Rule Engine (for defining and re-defining under the control of a user internationalisation rules for use by the internationalisation engine), a Resource Management Engine and a Translation Memory Engine (to assist the localisation engineer in performing the localisation process). Further components of the second embodiment include a Globalisation Content Management component, a Project Management component, a Dashboard and an Integrated Translation Environment.

The Project Management (PM) component provides the following functionalities:
a) Managing all projects for Internationalisation and Localisation;
b) Exporting and importing user project files;
c) Maintaining workspace for each project (check-in, check-out, version control).

d) Managing all users;

e) Grouping users by different roles;

f) Assigning permissions for different roles.

The Internationalisation Engine receives original Website code and performs a content analysis of each file in the Website code. Based on this analysis, the Internationalisation engine determines which language the Website code is written in, and accordingly chooses one of a number of components within it for parsing respective languages. In FIG. 7 these components are shown as a) an HTML Engine: To parse html pages.

b) a JavaScript Engine: To parse JavaScripts c) a JSP Engine: To parse Java ServerPages d) a CSS Engine: To parse cascading style sheets.

A further possible component, not shown in FIG. 7 would be a Perl Engine: To parse CGI programs written in Perl. Each of these components employs the set of internationalisation rules stored in the Rule Engine.

The Translation Memory Engine provides an interface to integrate with translation memory systems, for use in the localisation process. It supports importing and exporting Translation Memory Exchange files from/to translation memory systems.

The Resource Management Engine provides a universal interface between the other components and a repository of data.

The Globalisation Content Management component (GCM) controls the overall globalisation workflow, that is the internationalisation followed by a localisation. To globalise a web page, the GCM will first decompose the scripts and content from the page, then start the Internationalisation process with the support of the Internationalisation engine, generate the internationalized templates and resource bundles according to Internationalisation strategies, and manage locales for those resource bundles. It also includes the following utilities:

a) Content Recogniser—To filter the content of a web page with the function support of the computer language engines. Each file in the source web site will be parsed in order to separate the text segments, scripts and code from formatting information.

b) Content Change Detector—To detect any updated content and take actions according to those changes by automatically invoking the Internationalisation or Localisation process. When connected with a database or content management system (CMS), the Detector will wait for change notification from a database trigger or from the CMS Interface. The changed data, or a pointer to it, is passed to the Dashboard which is the workflow controller for the whole web globalisation process.

c) Content Decomposer—To divide the content of a web page into templates and resource bundles marked with different globalisation actions. The embodiment allows users to choose five actions for content globalisation:

1. "Preserve" means there is no change in the original content such as logo, trademark, etc.

2. "Substitute" means the content need to be replaced with the localised content.

3. "Translate" means the content need to be translated into localised content.

4. "Reject" means the content will be removed under other locales.

5. "Add" means some content will need to be added under other locales.

d) Content Combiner—To combine the internationalized templates with localised content.

The Dashboard component is a workflow controller. The workflow is specified as a series of processes that define what needs to be done at each step. The Dashboard manages each individual process involved in the globalisation activity, tracking the rules, roles, responsibilities, and status of a project's globalisation processes. Users can collaborate in creating and maintaining the tasks for a web site globalisation. A task is the manageable unit of work involved in the globalisation system. User can get his task list created by other members or automatically assigned by the system. Dashboard also includes a publisher to publish a globalised web site to web servers.

The Integrated Translation Environment (ITE) component helps to localise the decomposed source code and content. It manages resource bundles that are separated from source files. It provides the capabilities of exporting resource from the repository to translation vendors and importing translated resource into the repository.

The core of the translation environment is the Translation Platform Interface which is composed of Translation Memory API, Dictionary API and Machine Translation API. The second embodiment supports server-side dictionaries. Users can also customise and upload their dictionaries for different languages or get translation service from Internet dictionary providers. It provides translation engine for integration with Translation Memory Systems or Machine Translation Systems for faster and more efficient translations.

Figure 8:
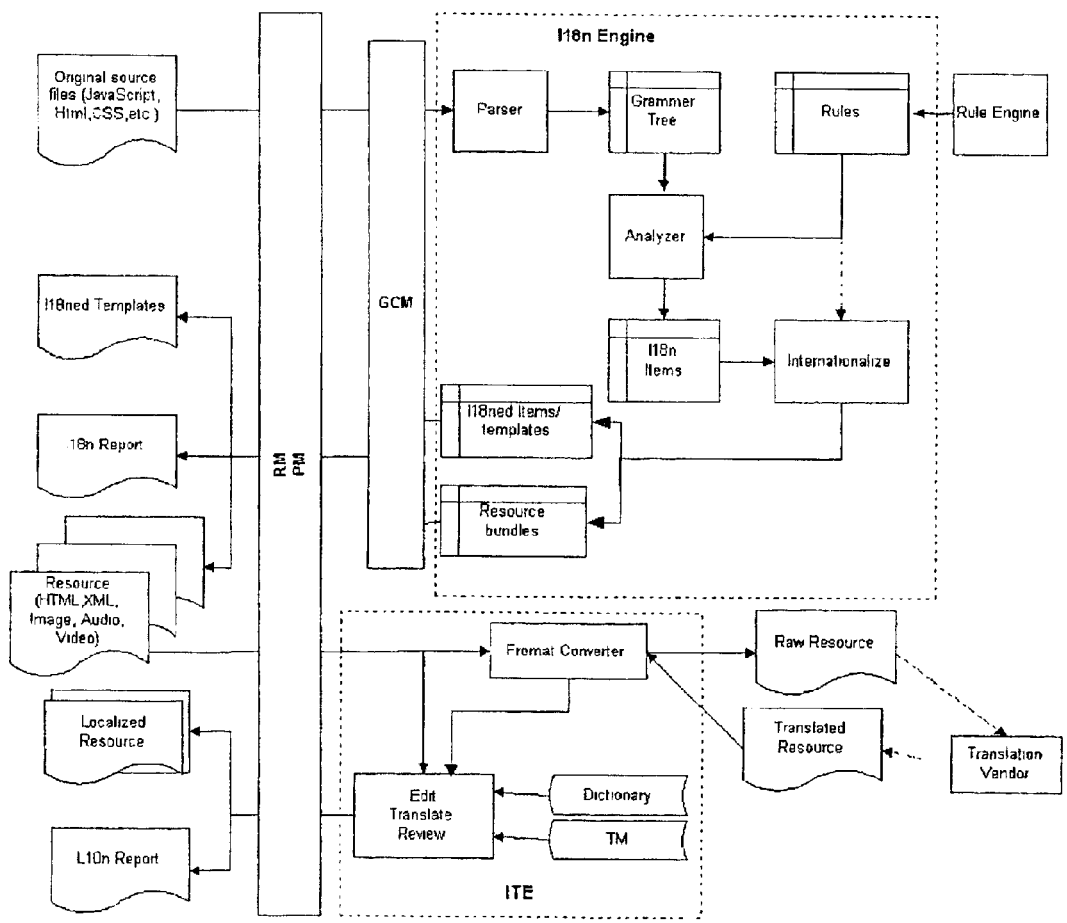
FIG. 8 shows the web globalisation process carried out by the second embodiment of the invention.

The overall web globalisation process of the second embodiment is shown in FIG. 8. The embodiment receives "original source files" into the project management unit. It passes the original source files to the Globalisation Content Management unit. The content management unit passes the source files to the Internationalisation engine, which performs a process similar to that explained in detail above with reference to the first embodiment. The source code is parsed to establish a grammar tree. It is then analysed by a "Analyser" unit corresponding to the "Analyzer" for the first embodiment. The Analyser uses internationalisation rules (which have been defined or modified using the rules engine) to form a list of potential Internationalisation Errors (called "I18 items" in FIG. 8). Those items are then processed by an "Internationalize" unit which performs the function of the Interlyzer of the first embodiment (also using the Internationalisation rules) to produce the resource bundle of information associated with the locale of the original source code and a locale-independent template. The results are passed back to the Globalisation Content Management Unit. The project management unit outputs the result (Internationalized templates, an Internationalisation report estimating the difficulty of internationalisation, and the resource bundle) to the Internationalisation engineer. At the same time the resource management unit passes all the same data to the repository.

If a user (e.g. localisation engineer) wishes to localise the resource bundle, he connects to the embodiment, and transmits the resource bundle to the Integrated Translation Environment. Under the control of the user, some portion of the resource bundle may be sent to a format converter which converts it into a format suitable for export from the system to an external translation vendor, from whom it re-enters the system as a translated resource. Other portions of the resource bundle are translated directly using a dictionary and a translation memory, in a way analogous to that shown in FIG. 6. The output of the Integrated Translation Environment is a localised resource bundle (i.e. localised for another location) and a localization report.

The embodiments of the invention have been described above in detail, but many variations are possible within the scope of the invention, as will be clear to a skilled reader. Although the embodiments contain a Localiser component, strictly speaking this is not necessary to produce a useful device, since the results of the Internationalisation process itself may be useful, for example to be used in combination with a different Localisation process than that described in this document, or indeed a manual localisation.

What is claimed is:

1. A computer-based method of processing software written in a programming language and containing data associated with a first locale, to generate a source code file which is locale independent and a resource pack consisting of data associated with the first locale, the source code file being arranged to co-operate with the resource pack to perform the function of the software, the method including:
    a first analysis step of using information associated with the programming language to generate a grammar tree representing the structure of the software;
    a second analysis step of using the grammar tree and a set of predefined internationalisation rules to identify and separate portions of the software potentially containing data associated with the first locale; and
    a partition step of using the identified portions of the software to generate the resource pack, and using the grammar tree to generate the locale independent source code file.

2. A method according to claim 1 in which the first analysis step includes using the specification of the programming language to perform (i) a scan phase in which the software is grouped into items having a collective meaning, and (ii) a parse phase in which the items are grouped hierarchically to form a grammar tree.

3. A method according to claim 2 in which the first analysis step further includes, after the parse phase, (iii) a semantic parse phase in which the grammar tree is supplemented by information identifying the function of the items, by reference to other software or a library of source code.

4. A method according to claim 1 in which the second analysis step includes a step of identifying strings within the software, and excluding from the set of strings any strings which, based on their locations in the grammar tree, do not need to be internationalized.

5. A method according to claim 1 in which the second analysis step includes a step of identifying functions within the software having respective locale dependent parameters.

6. A method according to claim 1 in which the second analysis step further includes using the internationalisation rules to generate suggestions for internationalisation of the identified portions of the software to partition it into locale independent source code and locale dependent resource files.

7. A method according to claim 1 in which the internationalisation rules are further used in the second analysis step to generate a numerical assessment of the difficulty of internationalizing the software.

8. A method according to claim 1 in which said partition step involves at least some interaction with a user.

9. A method according to claim 1 in which said partition step is performed entirely automatically.

10. A computer-based method of transforming software written in a programming language and containing data associated with a first locale into a software for other locales, the method including performing on the first software a method according to claim 1 to generate a source code file which is locale independent and a first resource pack consisting of data associated with the first locale, the source code file being arranged to co-operate with the first resource pack to perform the function of the software, and converting the data in the first resource pack from the first locale to the other locale to form a second resource pack.

11. A method according to claim 10 in which said step of conversion is performed using a dictionary database for suggesting translations of linguistic items in the resource pack, a user selecting between these translations.

12. A method according to claim 11 further employing a translation memory which retains a record of translations selected by the user, and uses the selected translations to generate translations for any further instances of the linguistic items in the resource pack.

13. A computer-based method of processing Website code containing data associated with a first locale, to generate a template file which is locale independent, at least one locale independent resource file, and a resource pack consisting of data associated with the first locale, the template file being arranged to co-operate with the locale independent Website source file and the resource pack to perform the function of the Website code, the method including:
    a first analysis step of using information associated with the language of the Website code to generate a grammar tree representing the structure of the Website code;
    a second analysis step of using the grammar tree and a set of predefined internationalisation rules to identify portions of the Website code potentially containing data associated with the first locale; and
    a partition step of using the identified portions of the Website code to generate the resource pack, and using the grammar tree to generate the template file and the locale independent Website source file.

14. A computer-based method of transforming Website code containing data associated with a first locale into Website code containing data associated with another locale, the method including:
    performing on the first Website code a method according to claim 13 to generate a template which is locale independent, at least one locale independent Website source file, and a first resource pack consisting of data associated with the first locale, the template file being arranged to co-operate with the resource file and the first resource pack to perform the function of the first Website code, and
    converting the data in the first resource pack from the first locale to the other locale to form a second resource pack, said template file.

15. A computer-based method of converting first computer code containing data associated with a first locale into a form suitable for adaptation to another locale, the method including:
    a first analysis step of using information associated with the language of the first computer code to generate a grammar tree representing the structure of the first computer code;
    a second analysis step of using the grammar tree and a set of predefined internationalisation rules to identify portions of the first computer code potentially containing data associated with the first locale; and
    a partition step of using the identified portions of the first code to generate a resource pack of data associated with the first locale, and using the grammar tree to generate at least one locale independent code file, the or each locale independent code file and the resource pack co-operating to perform the function of the first code.

16. A computer arranged to perform a method according to claim 1.

17. A computer program product such as a recording medium readable by a computer device, and operative to cause the computer device to perform a method according to claim 1.

18. A computer arranged to perform a method according to claim 13.

19. A computer program product such as a recording medium readable by a computer device, and operative to cause the computer device to perform a method according to claim 13.

20. A computer arranged to perform a method according to claim 15.

21. A computer program product such as a recording medium readable by a computer device, and operative to cause the computer device to perform a method according to claim 15.

\* \* \* \* \*